US012748468B2

(12) United States Patent
Narita

(10) Patent No.: US 12,748,468 B2
(45) Date of Patent: Sep. 29, 2026

(54) SEMICONDUCTOR STORAGE DEVICE WITH AN ELECTRONIC PART HAVING A BENT LEAD THAT EXTENDS INTO AND ALONG AN INNER FACE OF A SUBSTRATE RECESS

(71) Applicant: Kioxia Corporation, Tokyo (JP)

(72) Inventor: Teruyuki Narita, Tokyo (JP)

(73) Assignee: Kioxia Corporation, Tokyo (JP)

( * ) Notice: Subject to any disclaimer, the term of this patent is extended or adjusted under 35 U.S.C. 154(b) by 113 days.

(21) Appl. No.: 18/821,901

(22) Filed: Aug. 30, 2024

(65) Prior Publication Data

US 2025/0093919 A1 Mar. 20, 2025

(30) Foreign Application Priority Data

Sep. 19, 2023 (JP) ................................ 2023-150808

(51) Int. Cl.
*G06F 1/183* (2026.01)

(52) U.S. Cl.
CPC .................................... *G06F 1/183* (2013.01)

(58) Field of Classification Search
None
See application file for complete search history.

(56) References Cited

U.S. PATENT DOCUMENTS

| | | | | |
|---|---|---|---|---|
| 2011/0116236 | A1 | 5/2011 | Akahori | |
| 2014/0160681 | A1 | 6/2014 | Chen | |
| 2021/0015006 | A1* | 1/2021 | Muto | H05K 5/13 |
| 2021/0345489 | A1* | 11/2021 | Ryu | H01G 9/06 |
| 2022/0087072 | A1* | 3/2022 | Matsuda | H05K 7/20445 |
| 2023/0284390 | A1* | 9/2023 | Nagasawa | H05K 1/182 361/761 |
| 2023/0361093 | A1* | 11/2023 | Kamath | H05K 1/184 |

* cited by examiner

*Primary Examiner* — James Wu
*Assistant Examiner* — Christopher L Augustin
(74) *Attorney, Agent, or Firm* — Kim & Stewart LLP

(57) ABSTRACT

A semiconductor storage device includes a substrate, a semiconductor memory, a controller, and an electronic part. The substrate has opposing first and second faces extending in a first direction, a third face extending in a thickness direction of the substrate, a recess provided in the third face and extending in the thickness direction, and a conductive portion provided on an inner face of the recess. The electronic part has a main body and a lead protruding from the main body. The lead has a first portion, which protrudes linearly from the main body toward the recess in the first direction, and a second portion bent from the first portion and extending linearly along the inner face of the recess in the thickness direction, and the second portion is fixed to the conductive portion such that one portion of the first portion overlaps the recess when viewed in the first direction.

20 Claims, 14 Drawing Sheets

SEMICONDUCTOR STORAGE DEVICE WITH AN ELECTRONIC PART HAVING A BENT LEAD THAT EXTENDS INTO AND ALONG AN INNER FACE OF A SUBSTRATE RECESS

CROSS-REFERENCE TO RELATED APPLICATION(S)

This application is based upon and claims the benefit of priority from Japanese Patent Application No. 2023-150808, filed Sep. 19, 2023, the entire contents of which are incorporated herein by reference.

FIELD

Embodiments described herein relate generally to a semiconductor storage device.

BACKGROUND

A semiconductor storage device that includes a substrate that has a through-hole and an electronic part having a lead that is inserted into the through-hole is already known.

DETAILED DESCRIPTION

Figure 1:
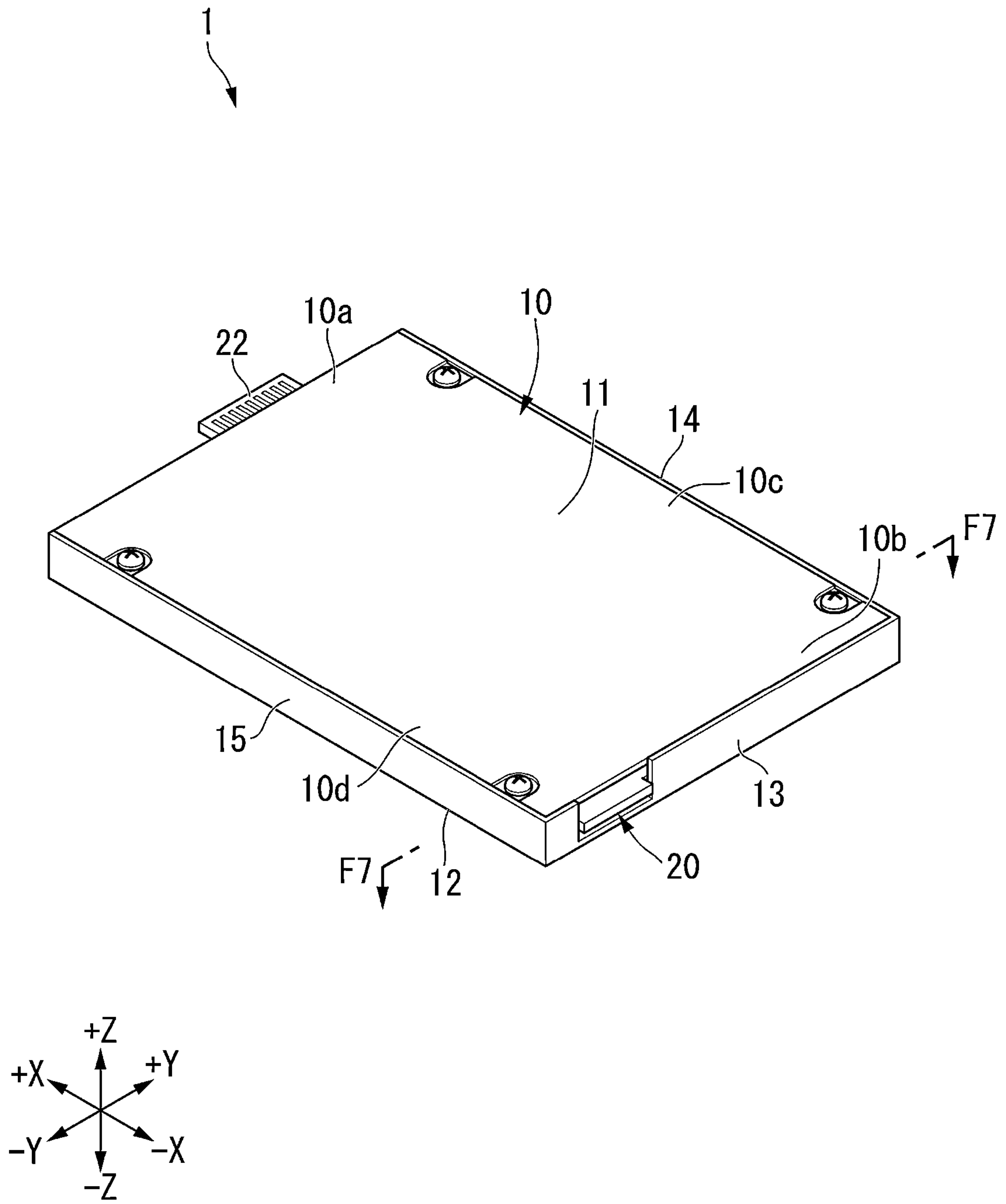
FIG. 1 is a perspective view showing a semiconductor storage device of a first embodiment.

Embodiments provide to achieve an improvement in manufacturability of a semiconductor storage device.

In general, according to one embodiment, a semiconductor storage device includes a substrate, a semiconductor memory, a controller, and an electronic part. The semiconductor memory is provided on the substrate. The controller is provided on the substrate and is configured to control the semiconductor memory. The electronic part is electrically connected to the substrate. The substrate has a first face extending in a first direction that intersects a thickness direction of the substrate, a second face positioned on a side opposite to that of the first face, a third face extending in a second direction, which is the thickness direction of the substrate, between the first face and the second face, a first recess provided in the third face and extending in the second direction, and a first conductive portion provided on an inner face of the first recess. The electronic part has a part main body, which overlaps the third face when viewed in the first direction, and a first lead protruding from the part main body. The first lead has a first portion, which protrudes linearly from the part main body toward the first recess in the first direction, and a second portion bent from the first portion and extending linearly along the inner face of the first recess in the second direction, and the second portion is fixed to the first conductive portion in a state in which at least one portion of the first portion overlaps the first recess when viewed in the first direction.

Hereafter, a semiconductor storage device according to embodiments will be described, with reference to the drawings. In the following description, identical reference signs are assigned to configurations having identical or similar functions. Also, redundant descriptions of those configurations may be omitted. In the present application, "parallel", "perpendicular", and "the same" may include cases of being "approximately parallel", "approximately perpendicular", and "approximately the same" respectively. In the present application, "overlap" means that virtual projected images of two objects overlap. That is, "overlap" is not limited to a case in which two objects are in contact, but may also include a case in which two objects are not in contact (for example, a case in which a space or another member exists between two objects). In the present application, "fixed" is not limited to a case in which two objects are fixed directly, but may also include a case in which two objects are fixed with another member interposed therebetween. In the present application, "connection" is not limited to a mechanical connection, but may also include an electrical connection. That is, "connection" is not limited to a case of being directly connected to an object, but may also include a case of being connected to an object with another member interposed therebetween.

In the present application, a +X direction, a −X direction, a +Y direction, a −Y direction, a +Z direction, and a −Z direction are defined as follows. The +X direction, the −X direction, the +Y direction, and the −Y direction are directions that are parallel to a first face 21*a* (refer to FIG. 2) of a substrate 21 to be described hereafter. The +X direction is a direction from a second end portion 10*b* toward a first end portion 10*a* of a housing 10 to be described hereafter (refer to FIG. 1). The −X direction is a direction that is opposite to the +X direction. When not distinguishing between the two, the +X direction and the −X direction are simply called the "X direction". The +Y direction and the −Y direction are directions that intersect (for example, are perpendicular to) the X direction. The +Y direction is a direction from a fourth end portion 10*d* toward a third end portion 10*c* of the housing 10 to be described hereafter (refer to FIG. 1). The −Y direction is a direction that is opposite to the +Y direction. When not distinguishing between the two, the +Y direction and the −Y direction are simply called the "Y direction". The +Z direction and the −Z direction are directions that intersect (for example, are perpendicular to) the X direction and the Y direction, and are thickness directions of the substrate 21. The +Z direction is a direction from the substrate 21 toward a first main wall 11 of the housing 10 (refer to FIG. 2). The −Z direction is a direction that is opposite to the +Z direction. When not distinguishing between the two, the +Z direction and the −Z direction are simply called the "Z direction".

First Embodiment

1. Semiconductor Storage Device Overall Configuration

Referring to FIGS. 1 to 7, a semiconductor storage device 1 of a first embodiment will be described. The semiconductor storage device 1 is a storage device such as a solid-state drive (SSD). The semiconductor storage device 1 is installed in a host device, and is used as a storage device of the host device. The host device is a personal computer, a mobile device, a video recorder, a vehicle mounted device, or the like, but is not limited to these examples.

FIG. 1 is a perspective view showing the semiconductor storage device 1. The semiconductor storage device 1 has, for example, the housing 10 and a substrate unit 20.

1.1 Housing

The housing 10 is a member that forms an outer shell of the semiconductor storage device 1. The housing 10 is of, for example, a flat, rectangular box form. The housing 10 has the first end portion 10*a* and the second end portion 10*b* as a pair of end portions separated in a longitudinal direction (the X direction) of the housing 10. The first end portion 10*a* has an aperture (not shown) in which a connector 22 of the substrate unit 20, to be described hereafter, is exposed to an exterior of the housing 10. The housing 10 has the third end portion 10*c* and the fourth end portion 10*d* as a pair of end portions separated in a lateral direction (the Y direction) of the housing 10.

The housing 10 has, for example, the first main wall 11, a second main wall 12, a first side wall 13, a second side wall 14, and a third side wall 15. The first main wall 11 is a wall that extends in the X direction and the Y direction. The first main wall 11 is positioned on the +Z direction side with respect to the substrate unit 20. The first main wall 11 faces the substrate 21 to be described hereafter from the +Z direction side. The second main wall 12 is a wall that extends in the X direction and the Y direction. The second main wall 12 is positioned on the −Z direction side with respect to the substrate unit 20. The second main wall 12 faces the substrate 21 from the −Z direction side. Each of the first side wall 13, the second side wall 14, and the third side wall 15 is a wall that extends in the Z direction, and extends between an end portion of the first main wall 11 and an end portion of the second main wall 12. The first side wall 13 is positioned in an end portion on the −X direction side of the housing 10. The second side wall 14 is positioned in an end portion on the +Y direction side of the housing 10. The third side wall 15 is positioned in an end portion on the −Y direction side of the housing 10.

1.2 Substrate Unit

Next, the substrate unit 20 will be described.

Figure 2:
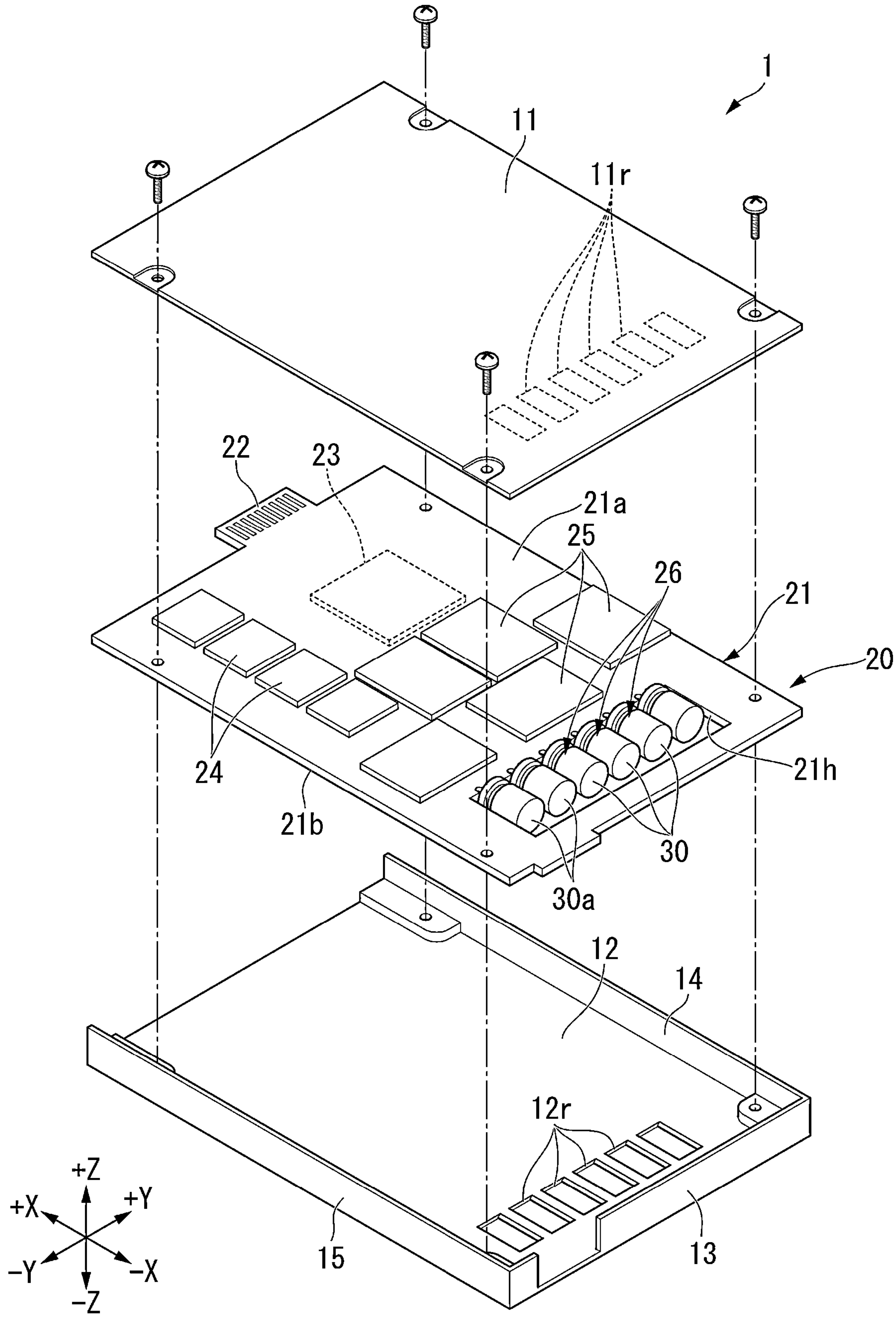
FIG. 2 is a perspective view showing the semiconductor storage device of the first embodiment partially disassembled.

FIG. 2 is a perspective view showing the semiconductor storage device 1 partially disassembled. The substrate unit 20 is housed in the housing 10. The substrate unit 20 has, for example, the substrate 21, the connector 22, a controller 23, multiple dynamic random-access memories (DRAMs) 24, multiple NAND flash memories 25 (hereafter referred to as "NAND 25"), and multiple capacitors 26.

The substrate 21 is a plate member that extends in the X direction and the Y direction. The substrate 21 is a printed circuit board, and includes an insulating base material, and a wiring pattern provided on the insulating base material. The substrate 21 has a first face 21*a*, and a second face 21*b* positioned on a side opposite to that of the first face 21*a*. The first face 21*a* extends in the X direction and the Y direction. The first face 21*a* is oriented in the +Z direction. The second face 21*b* extends in the X direction and the Y direction. The second face 21*b* is oriented in the −Z direction.

The substrate 21 has an aperture 21*h*. The aperture 21*h* is of, for example, a rectangular form having a longitudinal direction in the Y direction. The aperture 21*h* is a through—hole that penetrates the substrate 21 in the Z direction. A part main body 30 of the capacitor 26, to be described hereafter, is disposed in the aperture 21*h*. In the present embodiment, the aperture 21*h* is of a size such that the aperture 21*h* can house the part main bodies 30 of multiple capacitors 26, which are aligned in the Y direction.

The connector 22 is a connection portion that can be connected to a connector of the host device. The connector 22 is also called an edge connector. The connector 22 has multiple metal terminals that can be connected to a connector of the host device. The connector 22 is provided in an end portion on the +X direction side of the substrate 21.

The controller 23 is a part that controls the entire semiconductor storage device 1. The controller 23 is a semiconductor package including a system on a chip (SoC), for example, a host interface circuit with respect to the host device, a control circuit that controls the multiple DRAMs 24, a control circuit that controls the multiple NANDs 25, and the like that are integrated on one semiconductor chip. The controller 23 is provided on, for example, the second face 21*b* of the substrate 21.

The DRAM 24 is a semiconductor package including a volatile semiconductor memory chip. The DRAM 24 is a data buffer in which write target data received from the host device or read target data read from the NAND 25, or the like, are temporarily stored. The DRAM 24 is provided on, for example, the first face 21*a* of the substrate 21. The DRAM 24 may also be provided in an interior of the controller 23.

The NAND 25 is a semiconductor package including a non-volatile semiconductor memory chip. The NAND 25 is provided on, for example, the first face 21*a* and the second face 21*b* of the substrate 21. The multiple NANDs 25 are aligned in the X direction and the Y direction. The NAND 25 is one example of a "semiconductor memory". A "semiconductor memory" is not limited to the NAND 25, and may be another kind of semiconductor memory, such as a NOR memory, a magnetoresistive random-access memory (MRAM), or a resistive random-access memory.

The capacitor 26 is one of the parts electrically connected to the substrate 21. The capacitor 26, for example, performs a power supply back-up function with the object of data protection when there is an unexpected power interruption. When a power supply from the host device is unexpectedly interrupted, the capacitor 26 supplies power to the controller 23, the multiple DRAMs 24, and the multiple NANDs 25 for a certain time. The capacitor 26 is, for example, an electrolytic capacitor. Furthermore, the capacitor 26 is, for example, an aluminum electrolytic capacitor. The capacitor 26 is, however, not limited to the aforementioned examples.

Figure 3:
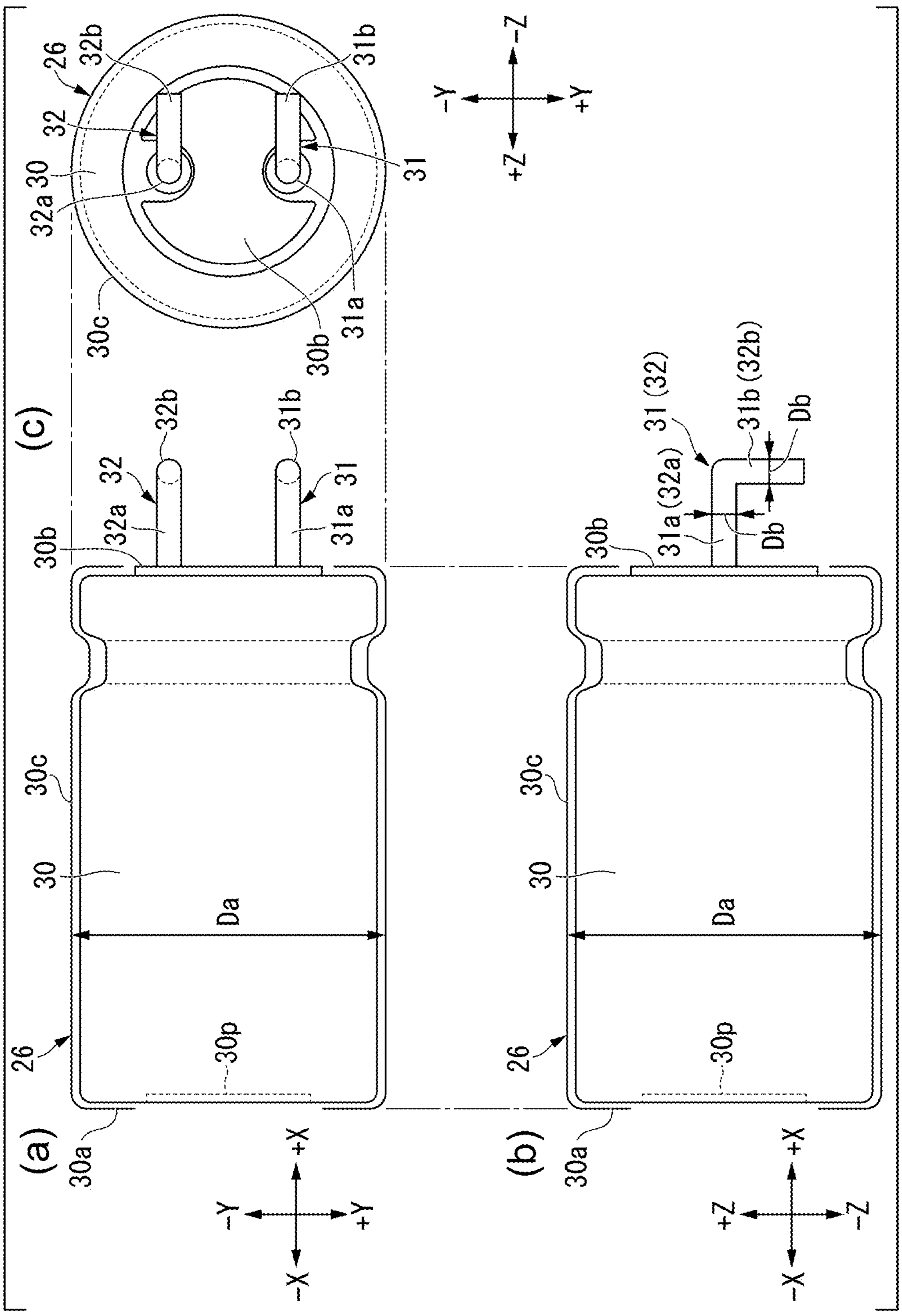
FIG. 3 is a drawing showing a capacitor of the first embodiment.

FIG. 3 is a drawing showing the capacitor 26. The capacitor 26 has, for example, the part main body 30, a first lead 31, and a second lead 32.

The part main body 30 is a portion that performs a main function of the electronic part. For example, the part main body 30 of the capacitor 26 is a portion that accumulates a charge as a result of a direct current voltage being applied. The part main body 30 includes, for example, metal that forms an electrode, a dielectric, and an electrolytic solution. The part main body 30 is of a cylindrical form. A diameter Da of the part main body 30 is greater than a thickness T (refer to FIG. 6) in the Z direction of the substrate 21. The part main body 30 includes, for example, a first end face 30*a*, a second end face 30*b*, and a peripheral face 30*c*.

The first end face 30*a* is an end face positioned on a side opposite to that of the first lead 31 and the second lead 32. The first end face 30*a* is circular. A pressure valve (e.g., safety valve) 30*p* is provided on the first end face 30*a*. The pressure valve 30*p* is opened when an internal pressure of the part main body 30 rises to or exceeds a predetermined reference value, such as when a problem occurs, and discharges a gas inside the part main body 30 to an exterior of the part main body 30.

The second end face 30*b* is positioned on a side opposite to that of the first end face 30*a*. The second end face 30*b* is circular. The first lead 31 and the second lead 32 protrude from the second end face 30*b*. The peripheral face 30*c* extends in directions that intersect (for example, are perpendicular to) the first end face 30*a* and the second end face 30*b*, and reaches the first end face 30*a* and the second end face 30*b*. The peripheral face 30*c* is of an annular form.

The first lead 31 is a first terminal used for electrical connection. The first lead 31 has a first portion 31*a* and a second portion 31*b*. The first portion 31*a* protrudes from the second end face 30*b* of the part main body 30. The first portion 31*a* protrudes in a direction that intersects (for example, is perpendicular to) the second end face 30*b*. The first portion 31*a* extends linearly in a direction away from the part main body 30. The second portion 31*b* is bent from a leading end of the first portion 31*a*, and extends linearly in a direction differing from (for example, perpendicular to) the first portion 31*a*. The second portion 31*b*, for example, extends parallel to the second end face 30*b*. The first portion 31*a* and the second portion 31*b* are of cylindrical forms having the same diameter Db. In the present embodiment, the L-shaped first lead 31 is formed by the first portion 31*a* and the second portion 31*b*.

The second lead 32 is a second terminal used for electrical connection. The second lead 32 has a third portion 32*a* and a fourth portion 32*b*. The third portion 32*a* protrudes from the second end face 30*b* of the part main body 30. The third portion 32*a* protrudes in a direction that intersects (for example, is perpendicular to) the second end face 30*b*. The third portion 32*a* extends linearly in a direction away from the part main body 30. The fourth portion 32*b* is bent from a leading end of the third portion 32*a*, and extends linearly in a direction differing from (for example, perpendicular to) the third portion 32*a*. The fourth portion 32*b*, for example, extends parallel to the second end face 30*b*. The third portion 32*a* and the fourth portion 32*b* are of cylindrical forms having the same diameter Db. In the present embodiment, the L-shaped second lead 32 is formed by the third portion 32*a* and the fourth portion 32*b*.

2. Capacitor Mounting Structure 2.1 Substrate Structure

Next, a mounting structure of the capacitor 26 will be described. Firstly, a structure of the substrate 21 relating to the mounting structure of the capacitor 26 will be described.

Figure 4:
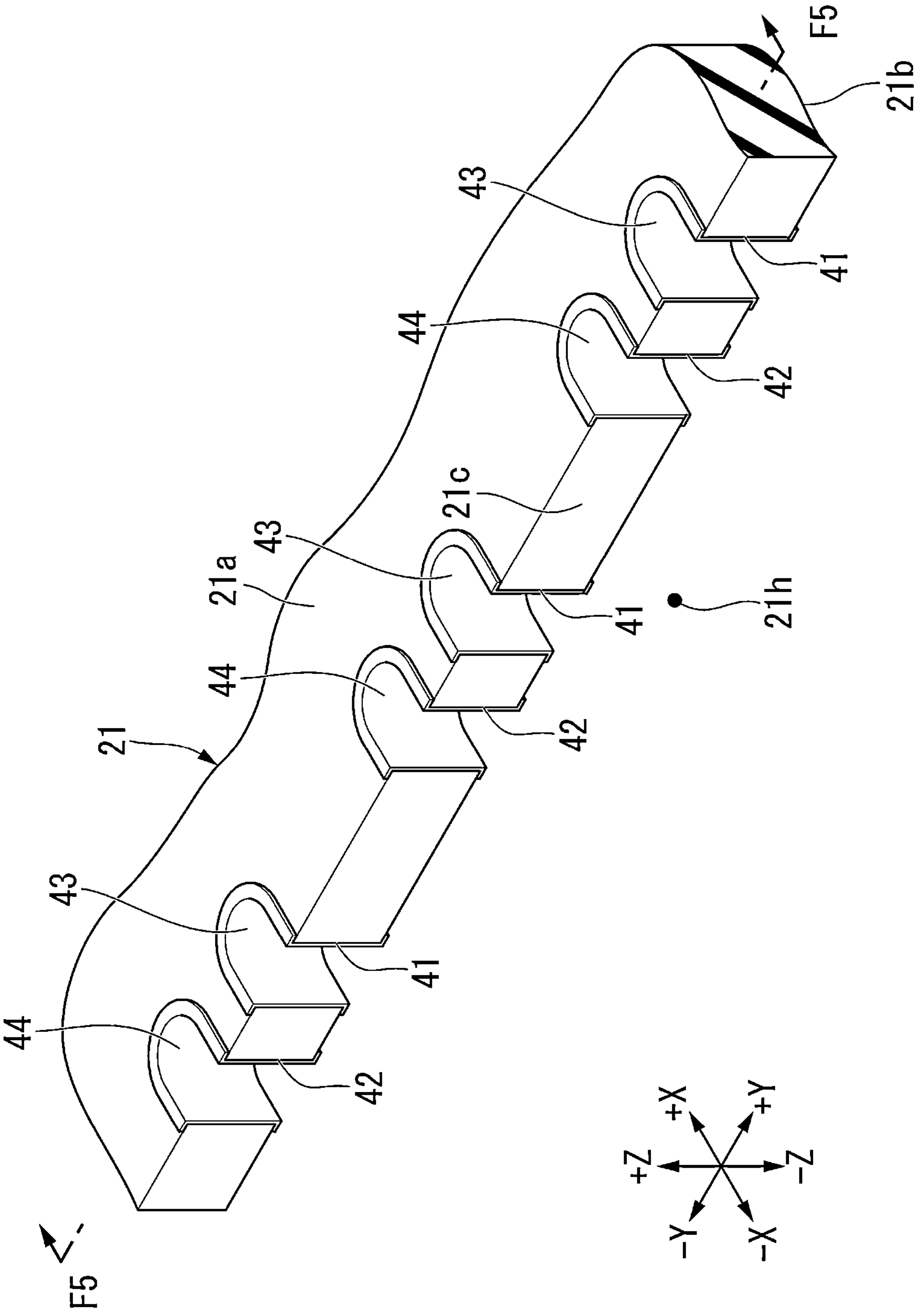
FIG. 4 is a perspective view showing one portion of a substrate of the first embodiment.

FIG. 4 is a perspective view showing one portion of the substrate 21 neighboring the aperture 21*h*. The substrate 21 has a third face 21*c*. The third face 21*c* extends in the Z direction, and reaches the first face 21*a* and the second face 21*b*. The third face 21*c* is an end face that regulates a thickness of the substrate 21. In the present embodiment, the third face 21*c* is an end face that neighbors the aperture 21*h*, and defines an edge of the aperture 21*h*.

In the present embodiment, the substrate 21 has a first recess 41, a second recess 42, a first conductive portion 43, and a second conductive portion 44 as one portion of the mounting structure of the capacitor 26.

The first recess 41 and the second recess 42 are provided in the third face 21*c*. The first recess 41 and the second recess 42 are positioned, for example, on the +X direction side with respect to the aperture 21*h*. The first recess 41 and the second recess 42 are disposed in differing positions in the Y direction. Each of the first recess 41 and the second recess 42 is recessed in the +X direction with respect to the third face 21*c*. The first recess 41 and the second recess 42 extend in the Z direction. For example, the first recess 41 and the second recess 42 penetrate the substrate 21 in the Z direction, and reach the first face 21*a* and the second face 21*b* of the substrate 21. In the present embodiment, an interior of the first recess 41 and an interior of the second recess 42 neighbor the aperture 21*h*. The interior of the first recess 41 and the interior of the second recess 42 communicate with the aperture 21*h*.

The first conductive portion 43 is provided on an inner face of the first recess 41. The first conductive portion 43 is, for example, a metal layer (for example, a plating layer) formed along the inner face of the first recess 41. The first conductive portion 43 is a metal layer having a thickness of, for example, 0.05 mm. The first conductive portion 43 may be provided on at least one of the first face 21*a* and the second face 21*b* of the substrate 21 in addition to the inner face of the first recess 41. The first conductive portion 43 is connected to the wiring pattern of the substrate 21.

The second conductive portion 44 is provided on an inner face of the second recess 42. The second conductive portion 44 is, for example, a metal layer (for example, a plating layer) formed along the inner face of the second recess 42. The second conductive portion 44 is a metal layer having a thickness of, for example, 0.05 mm. The second conductive portion 44 may be provided on at least one of the first face 21*a* and the second face 21*b* of the substrate 21 in addition to the inner face of the second recess 42. The second conductive portion 44 is connected to the wiring pattern of the substrate 21 in a state electrically isolated from the first conductive portion 43.

Figure 5:
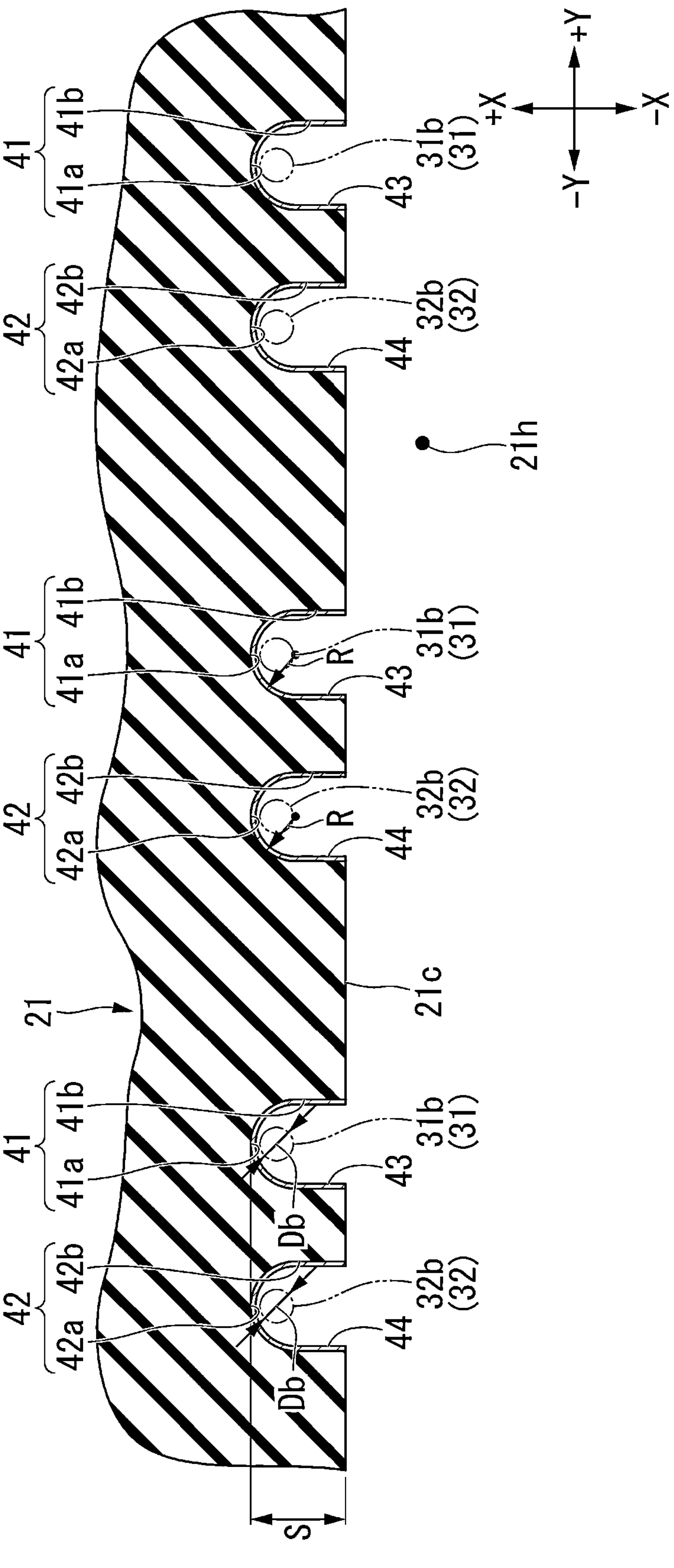
FIG. 5 is a sectional view along line F5-F5 of one portion of the substrate shown in FIG. 4.

FIG. 5 is a sectional view along line F5-F5 of one portion of the substrate 21 shown in FIG. 4. In the present embodiment, the first recess 41 has an arc portion 41*a* and a linear portion 41*b*. The arc portion 41*a* is positioned in an innermost portion of the first recess 41. The arc portion 41*a* is, for example, recessed in an arc form away from the aperture 21*h* when viewed in the Z direction. The arc portion 41*a* is of, for example, a semi-circular form when viewed in the Z direction. The linear portion 41*b* extends linearly in the −X direction from each Y direction end of the arc portion 41*a*. The linear portion 41*b* reaches the arc portion 41*a* and the third face 21*c*. The first conductive portion 43 is provided in both the arc portion 41*a* and the linear portion 41*b*.

The diameter Db of the second portion 31*b* of the first lead 31 is, for example, 0.5 mm (a tolerance is +/−0.05 mm). A radius of curvature R of the arc portion 41*a* is, for example, 0.5 mm. A length in the X direction of the linear portion 41*b* is 0.8 mm. In the present embodiment, a depth S in the X direction of the first recess 41 is greater than the diameter Db of the second portion 31*b* of the first lead 31. For example, the depth S in the X direction of the first recess 41 is two or more times greater than the diameter Db of the second portion 31*b* of the first lead 31.

In the same way, the second recess 42 has an arc portion 42*a* and a linear portion 42*b*. The arc portion 42*a* is positioned in an innermost portion of the second recess 42. The arc portion 42*a* is, for example, recessed in an arc form away from the aperture 21*h* when viewed in the Z direction. The arc portion 42*a* is of, for example, a semi-circular form when viewed in the Z direction. The linear portion 42*b* extends linearly in the −X direction from each Y direction end of the arc portion 42*a*. The linear portion 42*b* reaches the arc portion 42*a* and the third face 21*c*. The second conductive portion 44 is provided in both the arc portion 42*a* and the linear portion 42*b*.

The diameter Db of the fourth portion 32*b* of the second lead 32 is, for example, 0.5 mm (a tolerance is +/−0.05 mm). The radius of curvature R of the arc portion 42*a* is, for example, 0.5 mm. A length in the X direction of the linear portion 42*b* is 0.8 mm. In the present embodiment, the depth S in the X direction of the second recess 42 is greater than the diameter Db of the fourth portion 32*b* of the second lead 32. For example, the depth S in the X direction of the second recess 42 is two or more times greater than the diameter Db of the fourth portion 32*b* of the second lead 32.

2.2 Substrate and Capacitor Positional Relationship

Next, a positional relationship between the substrate 21 and the capacitor 26 will be described.

Figure 6:
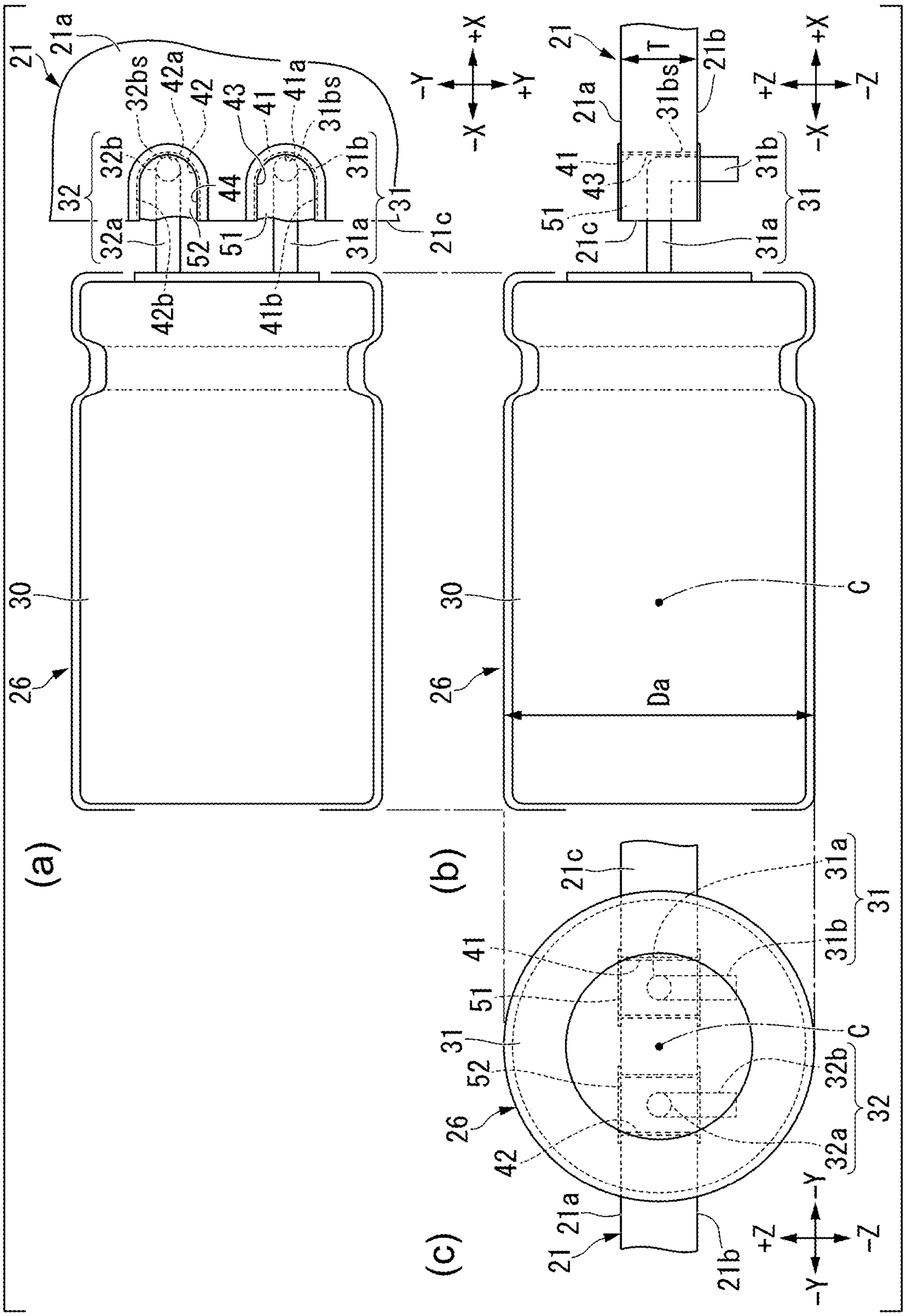
FIG. 6 is a drawing illustrating a positional relationship between the substrate and the capacitor of the first embodiment.

FIG. 6 is a drawing illustrating the positional relationship between the substrate 21 and the capacitor 26. As heretofore described, the part main body 30 of the capacitor 26 is disposed in the aperture 21*h*. The first end face 30*a* of the part main body 30 is disposed leaving at least a distance (for example, 2 mm) needed for the pressure valve 30*p* to open between the first end face 30*a* and the edge of the aperture 21*h* (refer to FIG. 2).

As shown in FIG. 6, the part main body 30 overlaps the third face 21*c* of the substrate 21 when viewed in the X direction. In the present embodiment, a center C in the Z direction of the part main body 30 overlaps the third face 21*c* of the substrate 21 when viewed in the X direction. For example, the center C in the Z direction of the part main body 30 overlaps a center in the Z direction of the substrate 21 when viewed in the X direction.

The first portion 31*a* of the first lead 31 protrudes from the part main body 30 toward the first recess 41. The leading end of the first portion 31*a* is positioned on an inner side of the first recess 41. The second portion 31*b* of the first lead 31 is bent in the −Z direction from the first portion 31*a* on the inner side of the first recess 41. The second portion 31*b* extends linearly in the Z direction in such a way as to follow the inner face of the first recess 41 in the interior of the first recess 41. The second portion 31*b* is of a cylindrical form extending in the Z direction. A peripheral face 31*bs* of the second portion 31*b* faces the arc portion 41*a* of the first recess 41. A leading end of the second portion 31*b*, for example, extends farther to the −Z direction side than the second face 21*b* of the substrate 21.

The second portion 31*b* is fixed to the first conductive portion 43 in a state in which at least one portion of the first portion 31*a* overlaps the first recess 41 when viewed in the X direction. The second portion 31*b* is connected to the first conductive portion 43, and is electrically connected to the wiring pattern of the substrate 21 via the first conductive portion 43.

In the present embodiment, a conductive first junction portion 51 is provided in the interior of the first recess 41. The first junction portion 51 is, for example, a solder. In the present embodiment, the second portion 31*b* of the first lead 31 is fixed to the first conductive portion 43 using the first junction portion 51. In the present embodiment, the interior of the first recess 41 is filled by the first junction portion 51. One portion of the first junction portion 51 is in contact with the second portion 31*b* of the first lead 31 from a side opposite to that of the first conductive portion 43.

In the same way, the third portion 32*a* of the second lead 32 protrudes from the part main body 30 toward the second recess 42. The leading end of the third portion 32*a* is positioned on an inner side of the second recess 42. The fourth portion 32*b* of the second lead 32 is bent in the −Z direction from the third portion 32*a* on the inner side of the second recess 42. The fourth portion 32*b* extends linearly in the Z direction in such a way as to follow the inner face of the second recess 42 in the interior of the second recess 42. The fourth portion 32*b* is of a cylindrical form extending in the Z direction. A peripheral face 32*bs* of the fourth portion 32*b* faces the arc portion 42*a* of the second recess 42. A leading end of the fourth portion 32*b*, for example, extends farther to the −Z direction side than the second face 21*b* of the substrate 21.

The fourth portion 32*b* is fixed to the second conductive portion 44 in a state in which at least one portion of the third portion 32*a* overlaps the second recess 42 when viewed in the X direction. The fourth portion 32*b* is connected to the second conductive portion 44, and is electrically connected to the wiring pattern of the substrate 21 via the second conductive portion 44.

In the present embodiment, a conductive second junction portion 52 is provided in the interior of the second recess 42. The second junction portion 52 is, for example, a solder. In the present embodiment, the fourth portion 32*b* of the second lead 32 is fixed to the second conductive portion 44 using the second junction portion 52. In the present embodiment, the interior of the second recess 42 is filled by the second junction portion 52. One portion of the second junction portion 52 is in contact with the fourth portion 32*b* of the second lead 32 from a side opposite to that of the second conductive portion 44.

3. Housing Structure

Next, a structure of the housing 10 will be described.

Figure 7:
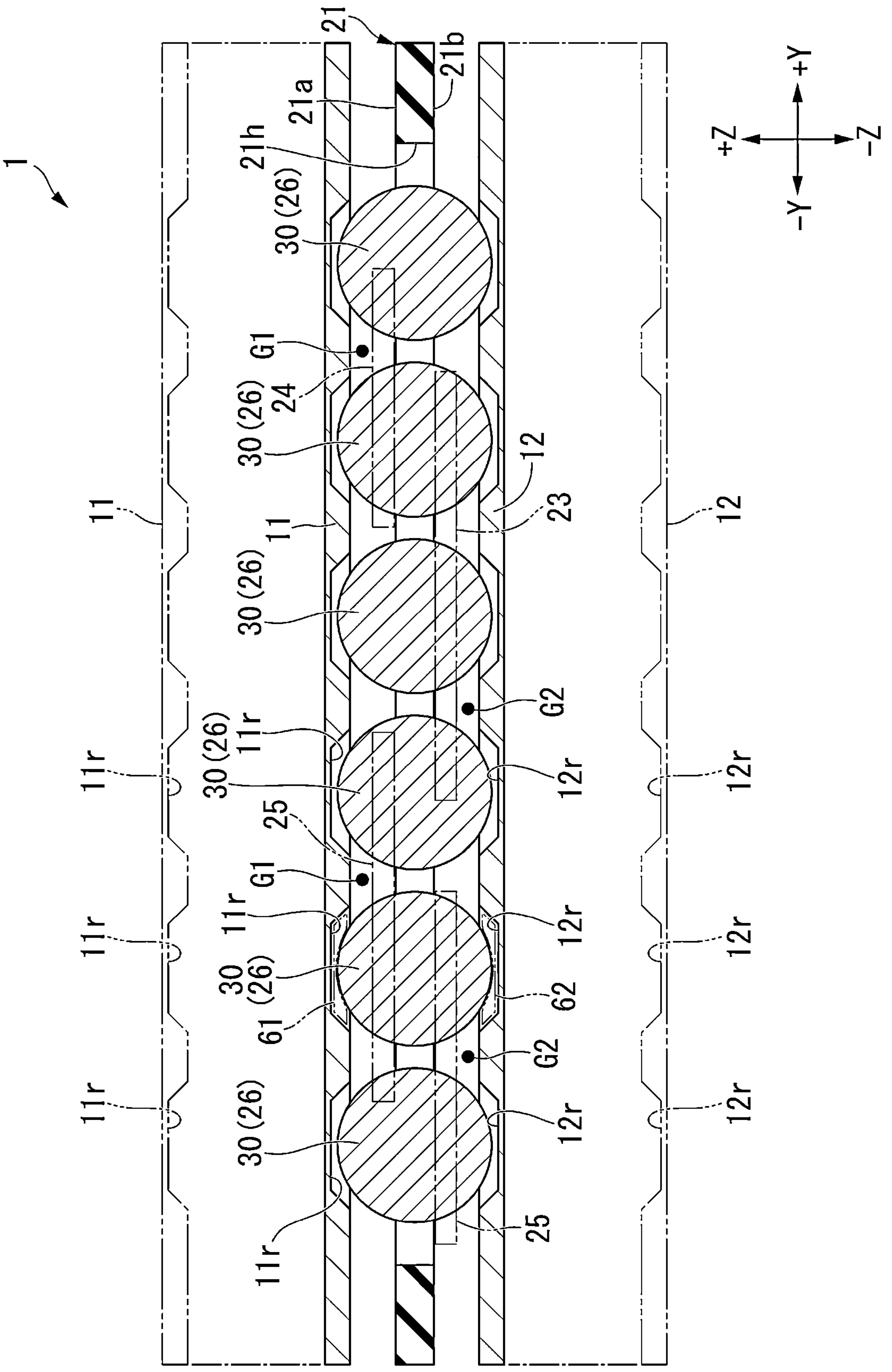
FIG. 7 is a sectional view along line F7-F7 of the semiconductor storage device shown in FIG. 1.

FIG. 7 is a sectional view along line F7-F7 of the semiconductor storage device 1 shown in FIG. 1. In the present embodiment, the first main wall 11 of the housing 10 has multiple recesses 11*r*. The multiple recesses 11*r* are disposed in positions corresponding in a one-to-one manner with the part main bodies 30 of the multiple capacitors 26. The recess 11*r* overlaps the part main body 30 of the capacitor 26 when viewed in the Z direction. The recess 11*r* is recessed to the +Z direction side, which is a direction away from the capacitor 26. One portion of the part main body 30 of the capacitor 26 is disposed on an inner side of the recess 11*r*, and is positioned farther to the +Z direction side than one portion (for example, an end on the −Z direction side) of the first main wall 11.

The second main wall 12 of the housing 10 has multiple recesses 12*r*. The multiple recesses 12*r* are disposed in positions corresponding in a one-to-one manner with the part main bodies 30 of the multiple capacitors 26. The recess 12*r* overlaps the part main body 30 of the capacitor 26 when viewed in the Z direction. The recess 12*r* is recessed to the −Z direction side, which is a direction away from the capacitor 26. One portion of the part main body 30 of the capacitor 26 is disposed on an inner side of the recess 12*r*, and is positioned farther to the −Z direction side than one portion (for example, an end on the +Z direction side) of the second main wall 12. The recess 12*r* of the second main wall 12 has, for example, a form that is the same as that of the recess 11*r* of the first main wall 11. The recess 12*r* of the second main wall 12 overlaps the recess 11*r* of the first main wall 11 when viewed in the Z direction.

A first buffering material 61 may be disposed between the recess 11*r* and the part main body 30 of the capacitor 26. The first buffering material 61 is, for example, made of a synthetic resin having flexibility, and has greater elasticity than the first main wall 11. The first buffering material 61 is, for example, sandwiched between the recess 11*r* and the part main body 30 of the capacitor 26. The first buffering material 61 restricts an impact imparted on the first main wall 11 from the exterior of the housing 10 from being transmitted unchanged to the part main body 30 of the capacitor 26.

A second buffering material 62 may be disposed between the recess 12*r* and the part main body 30 of the capacitor 26. The second buffering material 62 is, for example, made of a synthetic resin having flexibility, and has greater elasticity than the second main wall 12. The second buffering material 62 is, for example, sandwiched between the recess 12*r* and the part main body 30 of the capacitor 26. The second buffering material 62 restricts an impact imparted on the second main wall 12 from the exterior of the housing 10 from being transmitted unchanged to the part main body 30 of the capacitor 26.

As shown in FIG. 7, the first main wall 11 need not have the recess 11*r* in positions coinciding with the DRAM 24 and the NAND 25 in the Z direction. The first main wall 11 is physically separate from the DRAM 24 and the NAND 25. A first space G1 exists between the first main wall 11 and the DRAM 24 and the NAND 25.

The second main wall 12 need not have the recess 12*r* in positions coinciding with the controller 23 and the NAND 25 in the Z direction. The second main wall 12 is physically separate from the controller 23 and the NAND 25. A second space G2 exists between the second main wall 12 and the controller 23 and the NAND 25.

4. Advantages

A configuration in which a lead of the capacitor 26 is bent and inserted into a through-hole of the substrate 21 in order to arrange the part main body 30 of the capacitor 26 at a position opposing the third face 21*c* of the substrate 21 will be compared. In this case, it is necessary to bend the lead of the capacitor 26 at least three times in order to insert the lead of the capacitor 26 into the through-hole of the substrate 21. Because of this, the configuration of the comparison is such that an operation of bending the lead of the capacitor 26 is troublesome. As a result of this, achieving an improvement in manufacturability of a semiconductor storage device is difficult.

Meanwhile, in the present embodiment, the substrate 21 has the third face 21*c* extending in the Z direction, which is the thickness direction of the substrate 21, the first recess 41 provided in the third face 21*c* and extending in the Z direction, and the first conductive portion 43 provided on the inner face of the first recess 41. The capacitor 26 has the part main body 30, which overlaps the third face 21*c* of the substrate 21 when viewed in the X direction, and the first lead 31 protruding from the part main body 30. The first lead 31 has the first portion 31*a*, which protrudes from the part main body 30 toward the first recess 41, and the second portion 31*b*, which is bent from the first portion 31*a* and extends along the inner face of the first recess 41. The second portion 31*b* is fixed to the first conductive portion 43 in a state in which at least one portion of the first portion 31*a* overlaps the first recess 41 when viewed in the X direction.

With this kind of configuration, the number of times the first lead 31 of the capacitor 26 is bent can be reduced in comparison with that of the above-described comparison. For example, the number of times the first lead 31 of the capacitor 26 is bent can be reduced to only one. Because of this, the operation of bending the first lead 31 of the capacitor 26 becomes easier. Because of this, an improvement in manufacturability of the semiconductor storage device 1 can be achieved.

In the present embodiment, the inner face of the first recess 41 includes the arc portion 41*a*, which is recessed in a direction away from the part main body 30 of the capacitor 26 when viewed in the Z direction. The second portion 31*b* of the first lead 31 is of a cylindrical form extending in the Z direction. The peripheral face 31*bs* of the second portion 31*b* faces the arc portion 41*a* of the first recess 41. With this kind of configuration, the second portion 31*b* of the first lead 31 is more easily fixed to the first conductive portion 43 provided on the inner face of the first recess 41 than when the innermost portion of the first recess 41 is of a flat form, because curved faces are being fixed together. Because of this, a further improvement in manufacturability can be achieved.

In the present embodiment, the conductive first junction portion 51 is provided in the interior of the first recess 41. The second portion 31*b* of the first lead 31 is fixed to the first conductive portion 43 using the first junction portion 51. With this kind of configuration, fixing of the second portion 31*b* of the first lead 31 can be carried out in the interior of the first recess 41. Because of this, fixing of the first lead 31 can be carried out stably. Also, compared with a case in which a fixing structure is provided separately to the first recess 41*a*, a reduction in size of the substrate unit 20 can be achieved.

In the present embodiment, the second portion 31*b* of the first lead 31 is of a cylindrical form extending in the Z direction. The depth S in the X direction of the first recess 41 is greater than the diameter Db of the second portion 31*b* of the first lead 31. One portion of the first junction portion 51 is in contact with the second portion 31*b* of the first lead 31 from the side opposite to that of the first conductive portion 43. With this kind of configuration, the second portion 31*b* of the first lead 31 can be more stably fixed in the interior of the first recess 41.

In the present embodiment, the center C in the Z direction of the part main body 30 overlaps the third face 21*c* of the substrate 21 when viewed in the X direction. With this kind of configuration, a thinning of the housing 10 is more easily achieved than in a case in which the center C in the Z direction of the part main body 30 does not overlap the third face 21*c* of the substrate 21.

In the present embodiment, the first main face 11 of the housing 10 has the recess 11*r*, which is recessed in a direction away from the part main body 30, in a position coinciding with the part main body 30 when viewed in the Z direction. The second main face 12 of the housing 10 has the recess 12*r*, which is recessed in a direction away from the part main body 30, in a position coinciding with the part main body 30 when viewed in the Z direction. With this kind of configuration, a thinning of the housing 10 can be achieved while avoiding interference between the first main wall 11 and second main wall 12 and the part main body 30.

In the present embodiment, the first buffering material 61 disposed between the recess 11*r* and the part main body 30 and the second buffering material 62 disposed between the recess 12*r* and the part main body 30 are provided. With this kind of configuration, an improvement in shock resistance of the semiconductor storage device 1 can be achieved.

5. Modifications

Next, modifications of the first embodiment will be described. Configurations other than those described hereafter in each modification are the same as the configurations of the first embodiment. With these configurations, an improvement in manufacturability can be achieved also, in the same way as in the first embodiment.

5.1 First Modification

Figure 8:
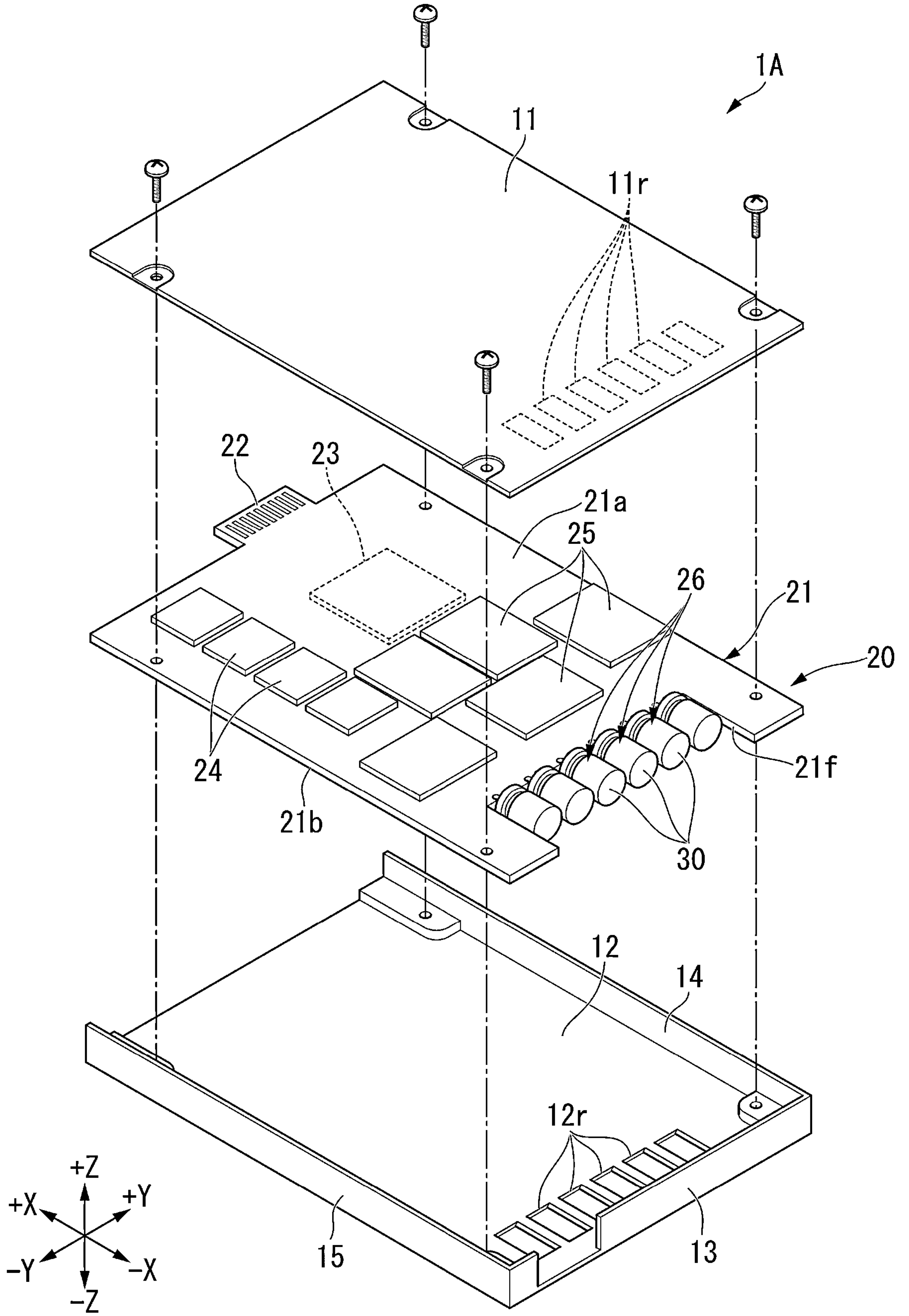
FIG. 8 is a perspective view showing a semiconductor storage device of a first modification of the first embodiment partially disassembled.

FIG. 8 is a perspective view showing a semiconductor storage device 1A of a first modification partially disassembled. In the present modification, the substrate 21 has a cutout 21*f* instead of the aperture 21*h*. The cutout 21*f* is provided in a −X direction end portion of the substrate 21. The cutout 21*f* is enclosed in the +X direction, the +Y direction, and the −Y direction by the substrate 21, and is opened in the −X direction. The cutout 21*f* penetrates the substrate 21 in the Z direction. In the present modification, the part main body 30 of the capacitor 26 is disposed in the cutout 21*f*.

5.2 Second Modification

Figure 9:
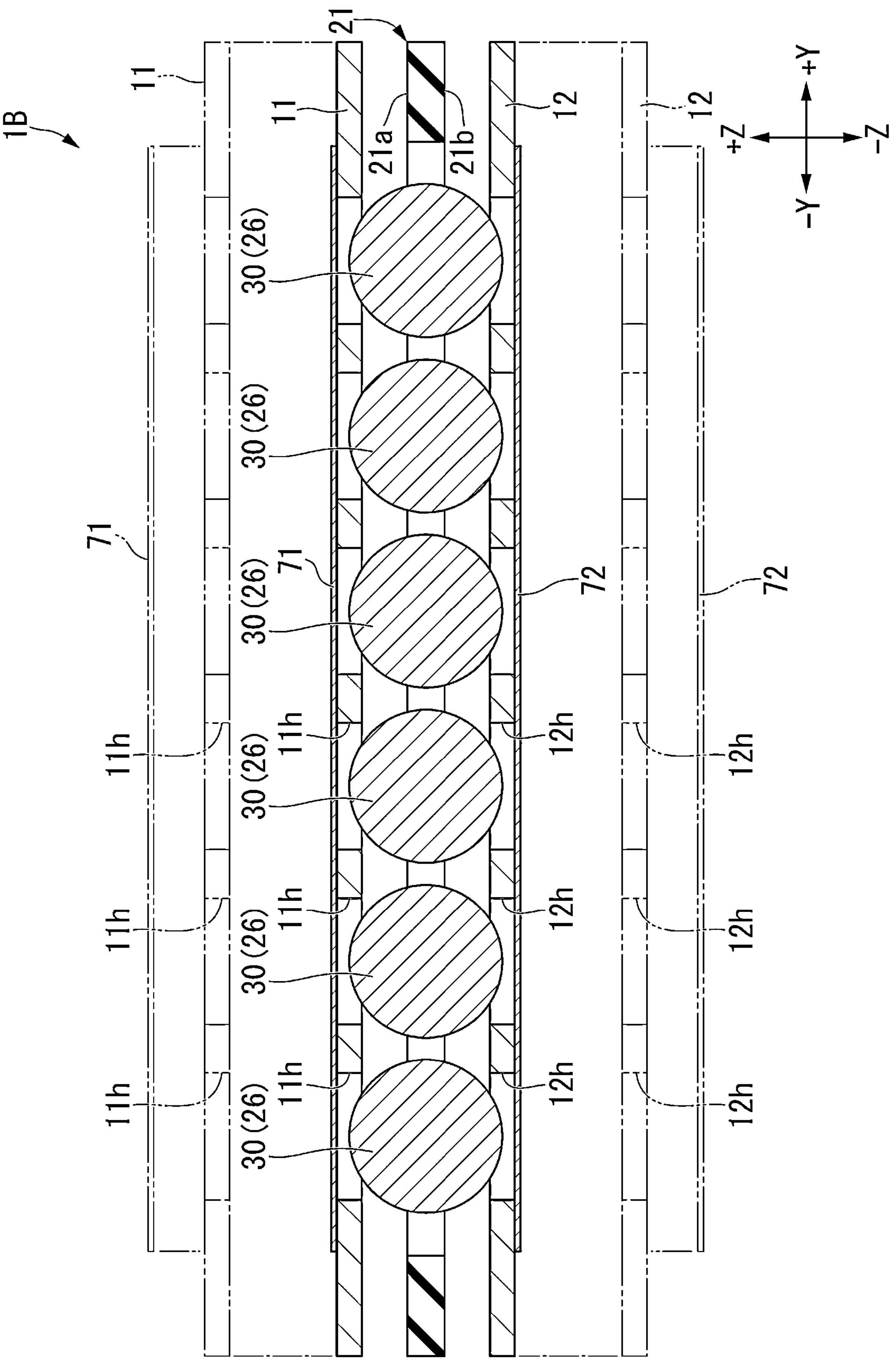
FIG. 9 is a sectional view showing a semiconductor storage device of a second modification of the first embodiment.

FIG. 9 is a sectional view showing a semiconductor storage device 1B of a second modification. FIG. 9 is a sectional view showing a cross-section of the semiconductor storage device 1B corresponding to the cross-section along line F7-F7 of the semiconductor storage device 1 shown in FIG. 1. In the present modification, the first main wall 11 of the housing 10 has multiple apertures 11*h* instead of the multiple recesses 11*r*. The multiple apertures 11*h* are disposed in positions that correspond in a one-to-one manner with the part main bodies 30 of the multiple capacitors 26. The aperture 11*h* overlaps the part main body 30 of the capacitor 26 when viewed in the Z direction. The aperture 11*h* is opened in the +Z direction, which is a direction away from the capacitor 26. The aperture 11*h* penetrates the first main wall 11 in the Z direction. For example, one portion of the part main body 30 of the capacitor 26 is disposed on an inner side of the aperture 11*h*, and is positioned farther to the +Z direction side than one portion (for example, an end on the −Z direction side) of the first main wall 11. A cover 71 may be attached to a surface of the first main wall 11. The cover 71 is of a size to cover the multiple apertures 11*h*, and blocks off the multiple apertures 11*h*.

The second main wall 12 of the housing 10 has a multiple apertures 12*h* instead of the multiple recesses 12*r*. The multiple apertures 12*h* are disposed in positions that correspond in a one-to-one manner with the part main bodies 30 of the multiple capacitors 26. The aperture 12*h* overlaps the part main body 30 of the capacitor 26 when viewed in the Z direction. The aperture 12*h* is opened in the −Z direction, which is a direction away from the capacitor 26. The aperture 12*h* penetrates the second main wall 12 in the Z direction. For example, one portion of the part main body 30 of the capacitor 26 is disposed on an inner side of the aperture 12*h*, and is positioned farther to the −Z direction side than one portion (for example, an end on the +Z direction side) of the second main wall 12. The aperture 12*h* of the second main wall 12 has, for example, a form the same as that of the aperture 11*h* of the first main wall 11. The aperture 12*h* of the second main wall 12 overlaps the aperture 11*h* of the first main wall 11 when viewed in the Z direction. In the present modification, a cover 72 may be attached to a surface of the second main wall 12. The cover 72 is of a size to cover the multiple apertures 12*h*, and blocks off the multiple apertures 12*h*.

5.3 Third Modification

Figure 10:
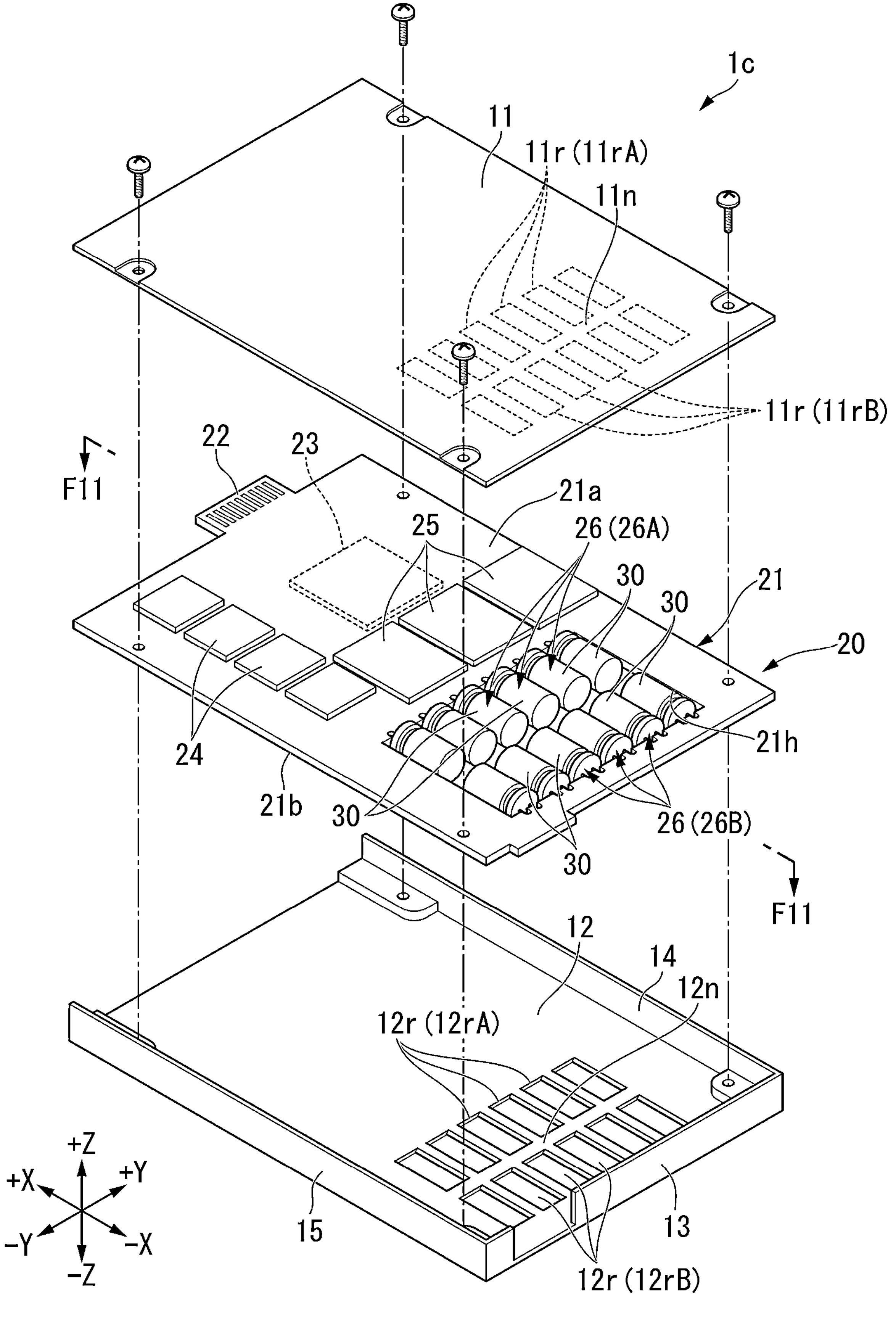
FIG. 10 is a perspective view showing a semiconductor storage device of a third modification of the first embodiment partially disassembled.

FIG. 10 is a perspective view showing a semiconductor storage device 1C of a third modification partially disassembled. In the present modification, the multiple capacitors 26 include a multiple capacitors 26A and a multiple capacitors 26B.

The multiple capacitors 26A are disposed on the +X direction side with respect to the multiple capacitors 26B. The multiple capacitors 26A are aligned in the Y direction. The first lead 31 and the second lead 32 of the capacitor 26A protrude to the +X direction side from the part main body 30 of the capacitor 26A. The first lead 31 and the second lead 32 of the capacitor 26A are inserted into the first recess 41 and the second recess 42 provided on the +X direction side of the aperture 21*h*.

Meanwhile, the multiple capacitors 26B are disposed between the multiple capacitors 26A and the first side wall 13 of the housing 10 in the X direction. The multiple capacitors 26B are aligned in the Y direction. The first lead 31 and the second lead 32 of the capacitor 26B protrude to the −X direction side from the part main body 30 of the capacitor 26B. The first lead 31 and the second lead 32 of the capacitor 26B are inserted into the first recess 41 and the second recess 42 provided on the −X direction side of the aperture 21*h*. A gap of a distance (for example, 2 mm) needed for the pressure valve 30*p* to open is opened between the capacitor 26A and the capacitor 26B aligned in the X direction.

The multiple recesses 11*r* provided in the first main wall 11 include a multiple recesses 11*r*A and a multiple recesses 11*r*B. The multiple recesses 11*r*A are disposed in positions that correspond in a one-to-one manner with the multiple capacitors 26A. The recess 11*r*A overlaps the part main body 30 of the capacitor 26A when viewed in the Z direction. One portion of the part main body 30 of the capacitor 26A is disposed on an inner side of the recess 11*r*A, and is positioned farther to the +Z direction side than one portion (for example, an end on the −Z direction side) of the first main wall 11.

The multiple recesses 11*r*B are disposed in positions corresponding one-to-one with the multiple capacitors 26B. The recess 11*r*B overlaps the part main body 30 of the capacitor 26B when viewed in the Z direction. One portion of the part main body 30 of the capacitor 26B is disposed on an inner side of the recess 11*r*B, and is positioned farther to the +Z direction side than one portion (for example, an end on the −Z direction side) of the first main wall 11.

The multiple recesses 12*r* provided in the second main wall 12 include multiple recesses 12*r*A and multiple recesses 12*r*B. The multiple recesses 12*r*A are disposed in positions that correspond in a one-to-one manner with the multiple capacitors 26A. The recess 12*r*A overlaps the part main body 30 of the capacitor 26A when viewed in the Z direction. One portion of the part main body 30 of the capacitor 26A is disposed on an inner side of the recess 12*r*A, and is positioned farther to the −Z direction side than one portion (for example, an end on the +Z direction side) of the second main wall 12.

The multiple recesses 12*r*B are disposed in positions corresponding one-to-one with the multiple capacitors 26B. The recess 12*r*B overlaps the part main body 30 of the capacitor 26B when viewed in the Z direction. One portion of the part main body 30 of the capacitor 26B is disposed on an inner side of the recess 12*r*B, and is positioned farther to the −Z direction side than one portion (for example, an end on the +Z direction side) of the second main wall 12.

Figure 11:
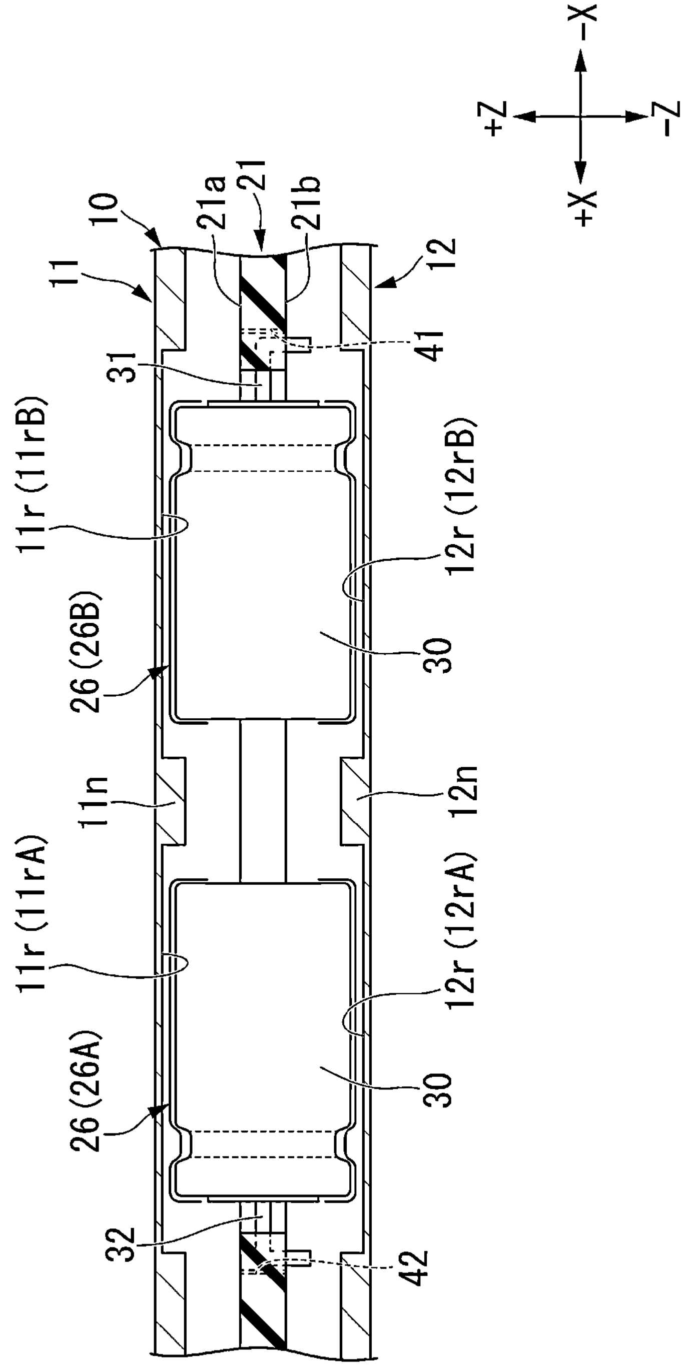
FIG. 11 is a sectional view along line F11-F11 of the semiconductor storage device shown in FIG. 10.

FIG. 11 is a sectional view along line F11-F11 of the semiconductor storage device 1C shown in FIG. 10. In the present modification, the first main wall 11 has a thick portion 11*n* between the recess 11*r*A and the recess 11*r*B. The thick portion 11*n* is a portion that is thicker than a portion of the first main wall 11 in which the recess 11*r*A or the recess 11*r*B is provided. The thick portion 11*n*, for example, extends in the Y direction while maintaining a constant thickness (refer to FIG. 10). In the present modification, a ridge extending in the Y direction is formed by the thick portion 11*n* between the recess 11*r*A and the recess 11*r*B.

In the same way, the second main wall 12 has a thick portion 12*n* between the recess 12*r*A and the recess 12*r*B. The thick portion 12*n* is a portion that is thicker than a portion of the second main wall 12 in which the recess 12*r*A or the recess 12*r*B is provided. The thick portion 12*n*, for example, extends in the Y direction while maintaining a constant thickness (refer to FIG. 10). In the present modification, a ridge extending in the Y direction is formed by the thick portion 12*n* between the recess 12*r*A and the recess 12*r*B.

Second Embodiment

Next, a second embodiment will be described. The present embodiment differs from the first embodiment in that a support part 80 that supports the capacitor 26 is provided. Configurations other than those described hereafter are the same as the configurations of the first embodiment.

Figure 12:
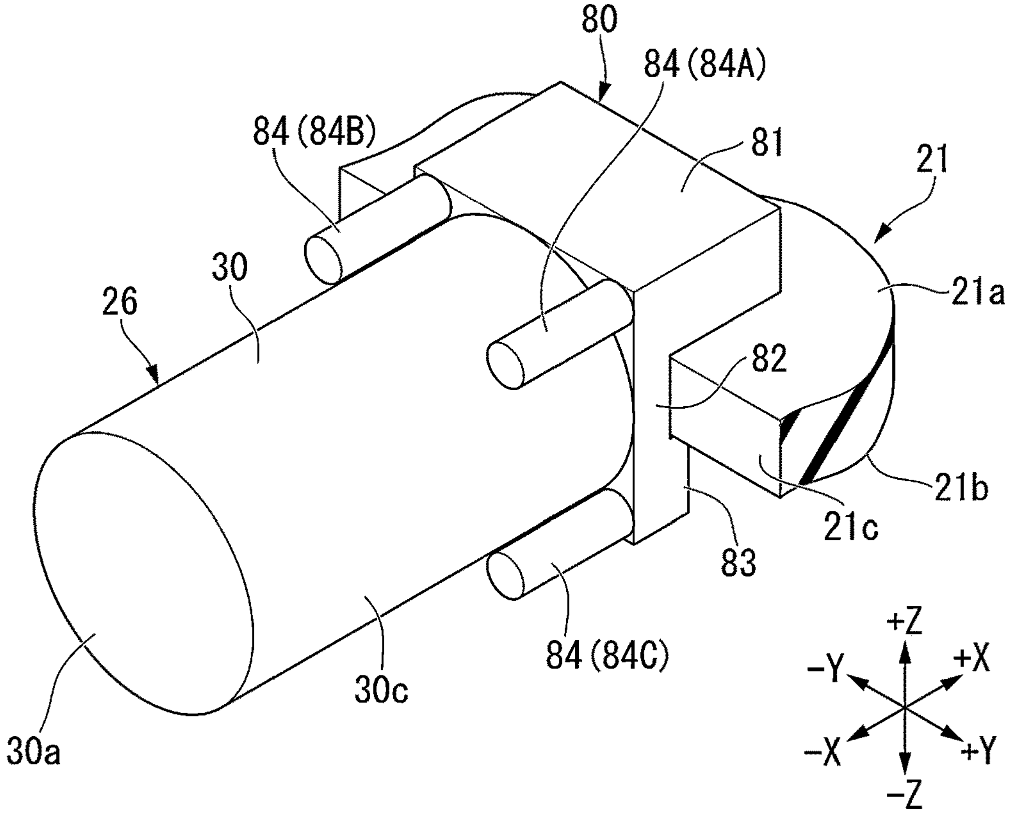
FIG. 12 is a perspective view showing one portion of a substrate unit of a second embodiment.
Figure 13:
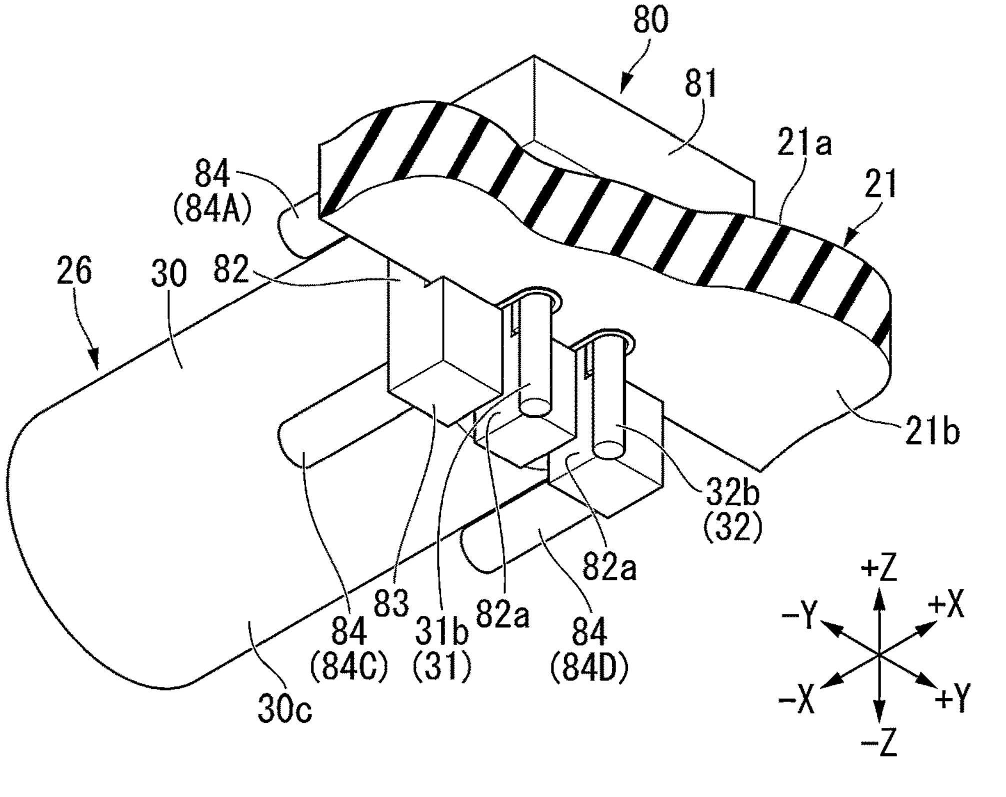
FIG. 13 is a perspective view showing one portion of the substrate unit of the second embodiment from another angle.
Figure 14:
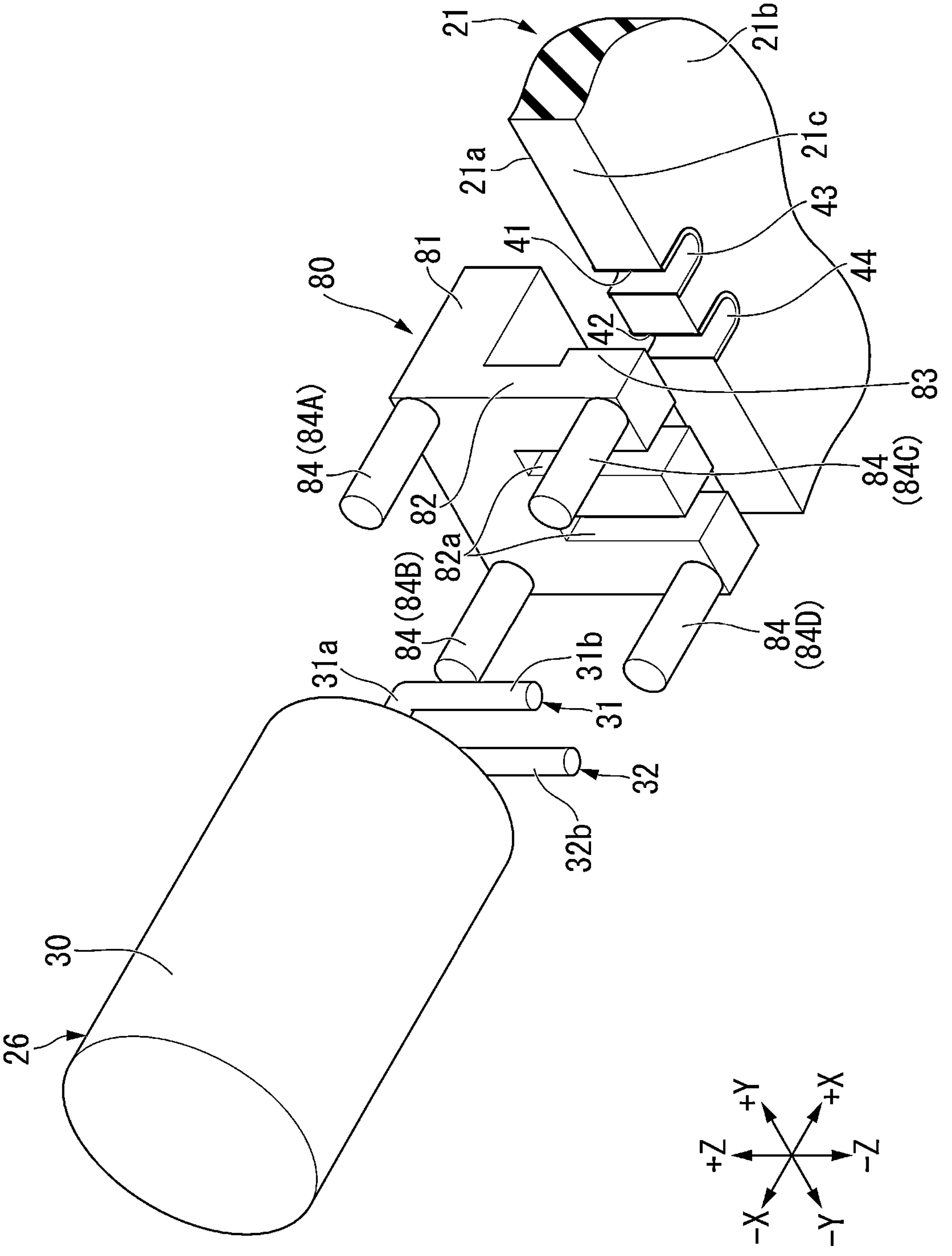
FIG. 14 is a perspective view showing the substrate unit of the second embodiment partially disassembled.

FIGS. 12 and 13 are perspective views showing a substrate unit 20D. FIG. 14 is a perspective view showing the substrate unit 20D of the second embodiment partially disassembled. In the present embodiment, the substrate unit 20D has the support part 80 in addition to the configuration of the substrate unit 20 described in the first embodiment. The support part 80 is attached to the substrate 21, and supports the capacitor 26. In the present embodiment, the support part 80 is disposed between the capacitor 26 and the third face 21*c* of the substrate 21 in the X direction.

Figure 15:
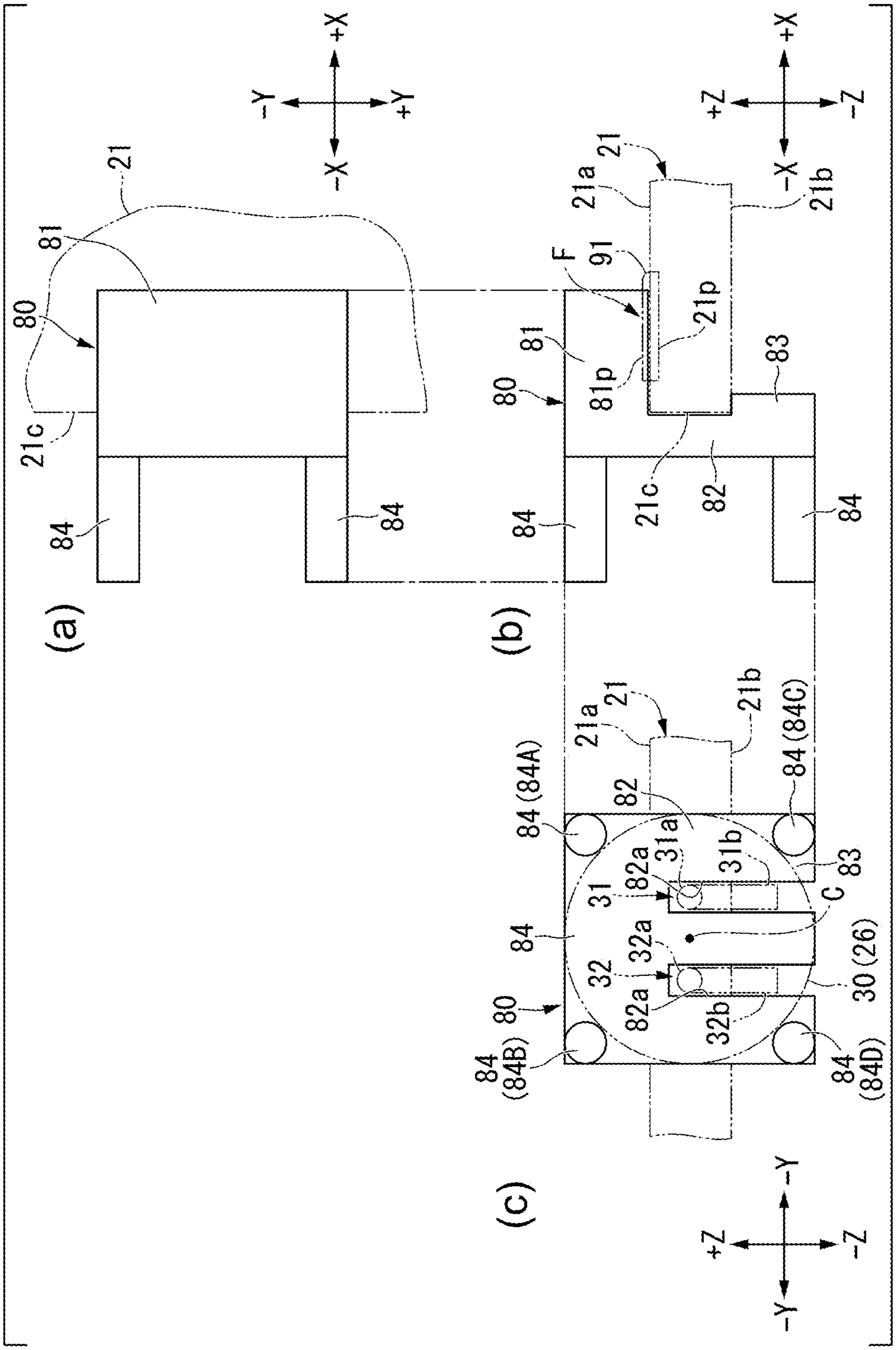
FIG. 15 is a drawing showing a support part of the second embodiment.

FIG. 15 is a drawing showing the support part 80. The support part 80 has, for example, a first base portion 81, a second base portion 82, a third base portion 83, and multiple support portions 84.

The first base portion 81 is in contact with the first face 21*a* of the substrate 21. The first base portion 81 has a fixing portion F, and is fixed to the first face 21*a* of the substrate 21. The fixing portion F includes, for example, a pad 81*p* provided on a face on the −Z direction side of the first base portion 81. In this case, the first face 21*a* of the substrate 21 has a pad 21*p* in a position corresponding to the pad 81*p*. A junction portion 91 such as a solder is provided between the pad 21*p* and the pad 81*p*. The junction portion 91 joins the pad 21*p* and the pad 81*p*. Because of this, the support part 80 is fixed to the substrate 21. The fixing portion F that fixes the support part 80 to the substrate 21 is not limited to the heretofore described example. For example, the fixing portion F may be a fastening member (for example, a screw) that fixes the first base portion 81 to the substrate 21, or the like.

The second base portion 82 extends in the −Z direction from an end portion on the −X direction side of the first base portion 81. The second base portion 82 is disposed between the part main body 30 of the capacitor 26 and the third face 21*c* of the substrate 21 in the X direction. For example, the second base portion 82 is sandwiched between the part main body 30 of the capacitor 26 and the third face 21*c* of the substrate 21. In this way, a position in the X direction of the part main body 30 is fixed.

The second base portion 82 has an insertion portion 82*a* in a position coinciding with the first lead 31 or the second lead 32 when viewed in the X direction. The insertion portion 82*a* extends through the second base portion 82 in the X direction, and the first lead 31 or the second lead 32 is passed therethrough. The insertion portion 82*a* extends in the −Z direction in such a way as to follow the second portion 31*b* of the first lead 31 or the fourth portion 32*b* of the second lead 32. In the present embodiment, the insertion portion 82*a* is provided continuously from the second base portion 82 to the third base portion 83. The insertion portion 82*a*, for example, reaches an end face on the −Z direction side of the third base portion 83 (refer to FIG. 13). Because of this, the first portion 31*a* and the second portion 31*b* of the first lead 31 (or the third portion 32*a* and the fourth portion 32*b* of the second lead 32) can be passed through the insertion portion 82*a* in the X direction.

The third base portion 83 protrudes in the +X direction from an end portion on the −Z direction side of the second base portion 82. The third base portion 83 is in contact with the second face 21*b* of the substrate 21. The third base portion 83 is in contact with the substrate 21 from a side opposite to that of the first base portion 81. Instead of or in addition to the fixing portion F being provided, the support part 80 may be fixed to the substrate 21 by the substrate 21 being sandwiched by the first base portion 81 and the third base portion 83.

The multiple support portions 84 protrude in the −X direction from the second base portion 82. The support portion 84 is of, for example, a cylindrical form extending in the X direction. The multiple support portions 84 are disposed separated in a periphery of the part main body 30 when viewed in the X direction. For example, two support portions 84A and 84B in the multiple support portions 84 are disposed on the +Z direction side with respect to the center C in the Z direction of the part main body 30. The two support portions 84A and 84B are disposed on either side of the part main body 30 in the Y direction, and are in contact with the peripheral face 30*c* of the part main body 30 (refer to FIG. 12). Two support portions 84C and 84D in the multiple support portions 84 are disposed on the −Z direction side with respect to the center C in the Z direction of the part main body 30. The two support portions 84C and 84D are disposed on either side of the part main body 30 in the Y direction, and are in contact with the peripheral face 30*c* of the part main body 30 (refer to FIG. 13). The part main body 30 is disposed among the multiple support portions 84, and is supported by the multiple support portions 84. In this way, positions in the Y direction and the Z direction of the part main body 30 are fixed.

The support part 80 may, for example, be attached to the substrate 21 before being attached to the capacitor 26. In this case, the capacitor 26 is attached to the support part 80 and the substrate 21 in a state in which the support part 80 is attached to the substrate 21. Instead of this, the support part 80 may be attached to the capacitor 26 before being attached to the substrate 21. In this case, the capacitor 26 and the support part 80 are attached to the substrate 21 in a state in which the capacitor 26 and the support part 80 are integrated.

With this kind of configuration, an improvement in manufacturability can be achieved, in the same way as in the first embodiment. Also, in the present embodiment, the support part 80, which is attached to the substrate 21 and supports the capacitor 26, is provided. The support part 80 has the first base portion 81, which is in contact with the first face 21*a* of the substrate 21, and the support portion 84 that supports the part main body 30 of the capacitor 26. With this kind of configuration, the capacitor 26 is more stably held by the support part 80 that has the first base portion 81. This means that when, for example, a shock is imparted from the exterior, the capacitor 26 is unlikely to be dislodged from the substrate 21. Because of this, an improvement in shock resistance can be achieved. Instead of or in addition to this, positioning of the capacitor 26 with respect to the substrate 21 becomes easier when the support part 80 is provided. Because of this, a further improvement in manufacturability can be achieved.

In the present embodiment, the first base portion 81 of the support part 80 is fixed to the first face 21*a* of the substrate 21. With this kind of configuration, the capacitor 26 is still more unlikely to be dislodged from the substrate 21 when, for example, a shock is imparted from the exterior. Because of this, a further improvement in shock resistance can be achieved.

In the present embodiment, the support part 80 further has the second base portion 82, which is in contact with the third face 21*c* of the substrate 21. With this kind of configuration, positioning in the X direction of the support part 80 and the capacitor 26 becomes easier to carry out owing to the second base portion 82 being in contact with the third face 21*c* of the substrate 21. Because of this, a further improvement in manufacturability can be achieved.

In the present embodiment, the second base portion 82 of the support part 80 has the insertion portion 82*a*, which penetrates the second base portion 82 in the X direction and through which the first lead 31 is passed. With this kind of configuration, the second base portion 82 of the support part 80 can easily be formed to be large, even when the first lead 31 exists. Because of this, positioning in the X direction of the support part 80 and the capacitor 26 becomes still easier to carry out.

While certain embodiments and modifications have been described, these embodiments and modifications have been presented by way of example only, and are not intended to limit the scope of the disclosure. For example, the embodiments and modifications may be realized by being combined with each other.

In the heretofore described embodiments, the first recess 41 and the second recess 42 are recesses that penetrate the substrate 21 in the Z direction. However, the first recess 41 and the second recess 42, not being limited to the heretofore described examples, may be recesses that are provided in only one portion in the Z direction of the substrate 21 (that is, recesses that do not completely penetrate the substrate 21 in the Z direction).

According to at least one of the heretofore described embodiments, a substrate has a first face extending in a first direction that intersects a thickness direction of the substrate, a second face positioned on a side opposite to that of the first face and extending in the first direction, a third face extending in a second direction, which is the thickness direction of the substrate, and reaching the first face and the second face, a recess provided in the third face and extending in the second direction, and a conductive portion provided on an inner face of the recess. An electronic part has a part main body, which overlaps the third face of the substrate when viewed in the first direction, and a lead protruding from the part main body. The lead has a first portion, which protrudes from the part main body toward the recess of the substrate, and a second portion bent from the first portion. The second portion is fixed to the conductive portion in a state in which at least one portion of the first portion overlaps the recess of the substrate when viewed in the first direction. With this kind of configuration, an improvement in manufacturability of a semiconductor storage device can be achieved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device, comprising:

a substrate;

a semiconductor memory provided on the substrate;

a controller that is provided on the substrate and is configured to control the semiconductor memory; and an electronic part electrically connected to the substrate, wherein the substrate has a first face extending in a first direction that intersects a thickness direction of the substrate, a second face positioned on a side opposite to that of the first face, a third face extending in a second direction, which is the thickness direction of the substrate, between the first face and the second face, a first recess provided in the third face and extending in the second direction, and a first conductive portion provided on an inner face of the first recess, the electronic part has a part main body, which overlaps the third face when viewed in the first direction, and a first lead protruding from the part main body, the first lead has a first portion, which protrudes linearly from the part main body toward the first recess in the first direction, and a second portion bent from the first portion and extending linearly along the inner face of the first recess in the second direction, and the second portion is fixed to the first conductive portion in a state in which at least one portion of the first portion overlaps the first recess when viewed in the first direction.

2. The semiconductor storage device according to claim 1, wherein the inner face of the first recess includes an arc portion that is recessed in an arc shape in a direction away from the part main body when viewed in the second direction, the second portion has a cylindrical shape extending in the second direction, and a peripheral face of the second portion faces the arc portion.

3. The semiconductor storage device according to claim 1, further comprising a conductive junction portion provided in an interior of the first recess, wherein the second portion is fixed to the first conductive portion through the conductive junction portion.

4. The semiconductor storage device according to claim 3, wherein the second portion has a cylindrical shape extending in the second direction, a depth in the first direction of the first recess is greater than a diameter of the second portion, and one portion of the conductive junction portion is in contact with the second portion from a side thereof that is opposite to that of the first conductive portion.

5. The semiconductor storage device according to claim 1, wherein a center in the second direction of the part main body overlaps the third face when viewed in the first direction.

6. The semiconductor storage device according to claim 1, wherein the substrate further has a second recess, which is provided in the third face at a position that is different from that of the first recess and extends in the second direction, and a second conductive portion provided on an inner face of the second recess, the electronic part further has a second lead protruding from the part main body, the second lead has a third portion, which protrudes linearly from the part main body toward the second recess in the first direction, and a fourth portion bent from the third portion and extending linearly along the inner face of the second recess in the second direction, and the fourth portion is fixed to the second conductive portion in a state in which at least one portion of the third portion overlaps the second recess when viewed in the first direction.

7. The semiconductor storage device according to claim 1, wherein the substrate has a space portion that is an aperture or a cutout, and the part main body is disposed in the space portion.

8. The semiconductor storage device according to claim 1, further comprising a support part that is attached to the substrate and supports the electronic part, wherein the support part has a first base portion that is in contact with the first face and a support portion that supports the part main body.

9. The semiconductor storage device according to claim 8, wherein the first base portion is fixed to the first face.

10. The semiconductor storage device according to claim 8, wherein the support portion further has a second base portion that is in contact with the third face.

11. The semiconductor storage device according to claim 10, wherein the second base portion has an insertion opening extending through the second base portion in the first direction, and through which the first lead is passed.

12. The semiconductor storage device according to claim 1, further comprising a housing in which the substrate, the semiconductor memory, the controller, and the electronic part are housed, wherein the housing has a first wall that faces the substrate from a first side in the second direction, and a second wall that faces the substrate from a second side opposite to the first side in the second direction, the first wall has a first non-planar portion that is recessed or opened in a direction away from the part main body in a position overlapping the part main body when viewed in the second direction, and the second wall has a second non-planar portion that is recessed or opened in a direction away from the part main body in a position overlapping the part main body when viewed in the second direction.

13. The semiconductor storage device according to claim 12, further comprising a first buffering material that is disposed between the first non-planar portion and the part main body and has a greater elasticity than the first wall, and a second buffering material that is disposed between the second non-planar portion and the part main body and has a greater elasticity than the second wall.

14. A semiconductor storage device, comprising:

a substrate;

a semiconductor memory provided on the substrate;

a controller that is provided on the substrate and is configured to control the semiconductor memory; and a plurality of capacitors, each electrically connected to the substrate, wherein the substrate has opposing first and second generally planar surfaces and an opening that extends through the substrate in a thickness direction of the substrate to expose a face having a plurality of notches, wherein each of the notches has a U-shape when viewed in the thickness direction and has a conductive portion provided on an inner face thereof, and each of the capacitors has a part main body and first and second leads protruding from the part main body, the first lead fixed to one of the plurality of notches through a first conductive solder and the second lead fixed to another one of the plurality of notches through a second conductive solder, wherein each of the first and second leads has a first portion, which protrudes linearly from the part main body toward the corresponding notch in a first direction parallel to the planar surfaces of the substrate and a second portion bent from the first portion and extending linearly along the inner face of the corresponding notch in the thickness direction.

15. The semiconductor storage device according to claim 14, wherein the second portion of each of the first and second leads has a cylindrical shape extending in the thickness direction, and a depth of each of the notches in the first direction is greater than a diameter of the second portion.

16. The semiconductor storage device according to claim 14, wherein the plurality of capacitors are aligned in a second direction that is perpendicular to the first direction and the thickness direction.

17. The semiconductor storage device according to claim 16, wherein the plurality of capacitors include a first group of capacitors that are arranged along a first line that extends in the second direction and a second group of capacitors that are arranged along a second line that extends in the second direction.

18. The semiconductor storage device according to claim 17, wherein the plurality of notches include first notches on a first face of the substrate and second notches on a second face of the substrate that opposes the first face across the opening, and the capacitors of the first group are fixed to the first notches and the capacitors of the second group are fixed to the second notches.

19. The semiconductor storage device according to claim 14, wherein the opening is a notch formed on a side of the substrate.

20. The semiconductor storage device according to claim 14, wherein the opening is a rectangular opening surrounded on all four sides thereof by the substrate.

* * * * *